US007771100B2

(12) United States Patent
Yamamoto et al.

(10) Patent No.: US 7,771,100 B2
(45) Date of Patent: Aug. 10, 2010

(54) SURFACE LIGHT SOURCE APPARATUS

(75) Inventors: Takako Yamamoto, Kusatsu (JP);
Masafumi Danno, Kusatsu (JP);
Mamoru Yabe, Sakado (JP); Gen Sakai,
Sakado (JP); Yoshihiro Ueno, Kusatsu
(JP)

(73) Assignee: OMRON Corporation, Kyoto (JP)

( * ) Notice: Subject to any disclaimer, the term of this patent is extended or adjusted under 35 U.S.C. 154(b) by 127 days.

(21) Appl. No.: 11/857,169

(22) Filed: Sep. 18, 2007

(65) Prior Publication Data
US 2008/0068858 A1    Mar. 20, 2008

(30) Foreign Application Priority Data
Sep. 19, 2006   (JP)   ............... 2006-252372

(51) Int. Cl.
*F21V 7/04*   (2006.01)
(52) U.S. Cl. ................... 362/606; 362/612; 362/615
(58) Field of Classification Search ......... 362/612, 362/606, 615
See application file for complete search history.

(56) References Cited

U.S. PATENT DOCUMENTS

| | | | | |
|---|---|---|---|---|
| 5,688,035 | A * | 11/1997 | Kashima et al. | 362/609 |
| 5,886,759 | A * | 3/1999 | Mashino et al. | 349/65 |
| 6,053,619 | A * | 4/2000 | Nakamura et al. | 362/609 |
| 6,435,685 | B2 * | 8/2002 | Matsushita | 362/608 |
| 6,825,894 | B2 * | 11/2004 | Aoyagi et al. | 349/61 |
| 7,101,073 | B2 * | 9/2006 | Li | 362/621 |
| 7,121,709 | B2 * | 10/2006 | Shinohara et al. | 362/606 |
| 7,157,125 | B2 * | 1/2007 | Kamiya et al. | 428/1.5 |
| 7,157,853 | B2 * | 1/2007 | Imai et al. | 313/512 |
| 7,491,977 | B2 * | 2/2009 | Fukasawa | 257/98 |
| 2006/0056200 | A1 * | 3/2006 | Yamashita et al. | 362/620 |
| 2006/0092665 | A1 * | 5/2006 | Kim et al. | 362/612 |
| 2007/0171673 | A1 * | 7/2007 | Song et al. | 362/612 |

FOREIGN PATENT DOCUMENTS

| | | |
|---|---|---|
| CN | 1204775 A | 1/1999 |
| CN | 1504810 A | 6/2004 |
| JP | 3371052 B2 | 11/2002 |
| JP | 2002-357823 A | 12/2002 |
| JP | 2003-215584 A | 7/2003 |

(Continued)

OTHER PUBLICATIONS

English machine translation of JP 2005-321586.*

(Continued)

*Primary Examiner*—Jong-Suk (James) Lee
*Assistant Examiner*—David R Crowe
(74) *Attorney, Agent, or Firm*—Osha • Liang LLP

(57) ABSTRACT

A surface light source apparatus including a point light source, a light guide plate which spreads light introduced from the point light source into a planar shape to output the light from a light outgoing plane, and a light blocking member which covers parts of the point light source and the light outgoing plane of the light guide plate. A gap shielding member is projected toward the light outgoing plane from a surface on a side facing the light outgoing plane of the light blocking member. At least a portion facing the light outgoing plane in the gap shielding member is made of a material having a light blocking property.

13 Claims, 10 Drawing Sheets

FOREIGN PATENT DOCUMENTS

| | | |
|---|---|---|
| JP | 2005-321586 A | 11/2005 |
| JP | 2005321586 A * | 11/2005 |
| JP | 2006-073507 A | 3/2006 |

OTHER PUBLICATIONS

English abstract of JP2003215584 published Jul. 30, 2003, esp@cenet database, 1 page.

English abstract of JP2002357823 published Dec. 13, 2002, esp@cenet database, 1 page.

English abstract of JP2005321586 published Nov. 17, 2005, esp@cenet database, 1 page.

English abstract of JP8327828 (Publication of JP Patent 3371052) published Dec. 13, 1996, esp@cenet database, 1 page.

Notice of Opinion of First Examination issued in Chinese Application No. 2007101409716 mailed Aug. 29, 2008 and English translation thereof, 21 pages.

* cited by examiner (a)

(b)

(a)

(b)

SURFACE LIGHT SOURCE APPARATUS

BACKGROUND OF THE INVENTION

1. Field of the Invention

The present invention relates to a surface light source apparatus. For example, the surface light source apparatus according to the present invention is used as a backlight for a liquid crystal display device.

2. Description of the Related Art

FIG. 1 shows an enlarged cross-sectional view, partially broken away, of schematic structure near a light source of a conventional surface light source apparatus. In a light source 12 used in a surface light source apparatus 11, vertical and horizontal surfaces and a rear surface of a transparent resin 14 sealing a LED 13 are covered with a case 15 made of a white resin, and only a front face of the transparent resin 14 is exposed from the case 15. The light source 12 is mounted on a flexible printed board 16. The light source 12 is vertically inverted such that the flexible printed board 16 is faced up, and the front face of the light source 12 faces an end face (light incident plane 18) of a light guide plate 17. A diffusing sheet 20 is disposed while facing a light outgoing plane 19 of the light guide plate 17, and a reflector plate 21 is disposed while facing a back side of the light guide plate 17. For example, Japanese Patent Application Laid-Open No. 2003-215584 discloses the surface light source apparatus having the above configuration.

In order to achieve a low profile of the light guide plate 17 or enhancement of light use efficiency, as shown in FIG. 1, a height of the front face of the transparent resin 14 in the light source 12 is equal to a thickness of the light guide plate 17, and the light source 12 is disposed such that a center in a height direction of the transparent resin 14 coincides with a center in a thickness direction of the light guide plate 17. Therefore, a gap is generated between the light outgoing plane 19 of the light guide plate 17 and the flexible printed board 16, and light L leaking from a gap between the light source 12 and the light incident plane 18 of the light guide plate 17 passes to the outside through the gap between the light outgoing plane 19 and the flexible printed board 16 without passing through the light guide plate 17 as shown by an arrow of FIG. 1. As a result, although the gap between the light source 12 and the light incident plane 18 of the light guide plate 17 is covered with the flexible printed board 16, an eye-shaped high-brightness region is generated near (portion designated by the letter P of FIG. 1) an edge of the flexible printed board 16 in front of the light source 12, and the region glitters like an eye when the surface light source apparatus 11 is obliquely observed, which remarkably impairs evenness in a light emission surface of the surface light source apparatus 11.

Because a rim sheet (frame material) is overlapped on the flexible printed board 16, when an opening of the rim sheet is decreased to extend an edge on an inner peripheral side of the opening of the rim sheet to the inside from an end on a light guide plate side of the flexible printed board 16, the eye-shaped high-brightness region is hardly viewed. However, when the opening of the rim sheet is excessively decreased, because an effective region of the surface light source apparatus becomes small compared with an outer shape size of the surface light source apparatus, from a practical standpoint, it is difficult to excessively decrease the opening of the rim sheet.

In a backlight disclosed in Japanese Patent Application Laid-Open No. 2002-357823, gap between the light source and the light guide plate is covered with a light blocking tape. At this point, when the whole surface of the light blocking tape is bonded to the light outgoing plane of the light guide plate, an adhesive agent constitutes a light guide, the light leaks from between the light guide plate and the light blocking tape, and the edge of the light blocking tape also glitters like an eye. Therefore, in the backlight disclosed in Japanese Patent Application Laid-Open No. 2002-357823, only both ends of the light blocking tape are bonded to the light outgoing plane with an adhesive agent, and the light blocking tape is not bonded in at least the light source portion.

However, in the backlight disclosed in Japanese Patent Application Laid-Open No. 2002-357823, because the light blocking tape is not bonded to the light guide plate in the light source portion, the gap between the light blocking tape and the light guide plate is generated in that portion. Therefore, as with the surface light source apparatus shown in FIG. 1, the light leaks from the gap between the light guide plate and the light blocking tape, and the phenomenon in which the edge of the light blocking tape glitters like an eye cannot sufficiently be solved.

In a surface light source apparatus disclosed in Japanese Patent Application Laid-Open No. 2005-321586, the flexible printed board adheres to the light guide plate with a double-sided adhesive tape. In the double-sided adhesive tape, a reflecting layer is formed on one of surfaces of a tape substrate, and a tackiness agent having a high light transmission property is provided on a surface of the reflecting layer. A colored layer is formed on the other surface of the tape substrate, and the tackiness agent having a high light transmission property is provided on a surface of the colored layer. The tackiness agent on the reflecting surface side of the double-sided adhesive tape adheres to the light guide plate, and the tackiness agent on the colored layer side adheres to the flexible printed board. Therefore, the light leaking from between the flexible printed board and the light guide plate is reflected by the reflecting layer, whereby the light is incident on the light guide plate.

However, in the surface light source apparatus disclosed in Japanese Patent Application Laid-Open No. 2005-321586, the light passes through the tackiness agent of the double-sided adhesive tape adhering to the light guide plate, and the light leaks from the gap between the flexible printed board and the light guide plate. Even if the leaking light is reflected by the reflecting layer of the double-sided adhesive tape, at least part of the reflected light is transmitted through the light guide plate and reflected by the reflector plate on the back side, and the light is transmitted through the light guide plate again and outputted from the light outgoing plane. Therefore, even though the gap between the flexible printed board and the light guide plate is closed by the double-sided adhesive tape, there is no effect of eliminating the eye-shaped high-brightness region.

In a surface light source apparatus disclosed in Japanese Patent No. 3371052, end portions of the light guide plate and diffusing sheet are inserted into a recess provided in a front face of the light source, an end portion of the light outgoing plane of the light guide plate is covered with a case of the light source, and the end face of the diffusing sheet is covered with a light blocking wall provided in the case of the light source, a reflecting sheet in the light source and the like, thereby preventing the leakage of the light from the gap between the light guide plate and the case of the light source.

However, because a cold-cathode tube is used in the surface light source apparatus disclosed in Japanese Patent No. 3371052, the surface light source apparatus disclosed in Japanese Patent No. 3371052 cannot be applied to the surface light source apparatus having the light source in which a LED is used. That is, because the light source in which a LED is used is a micro component having a depth of several millimeters, a width of several millimeters, and a thickness not more than 1 mm, it is actually difficult that the end portions of the light guide plate and diffusing sheet are inserted into the recess of the light source, and the it is difficult to realize the practical application of the surface light source apparatus disclosed in Japanese Patent No. 3371052 for the light source in which a LED is used.

SUMMARY OF THE INVENTION

In view of the foregoing, an object of the present invention is to provide a surface light source apparatus which can prevent the generation of the eye-shaped high-brightness region, caused by the light leaking from the flexible printed board covering the gap between the light guide plate and the light source or from the gap between the light blocking member and the light guide plate, around the edge of the flexible printed board or light blocking member near the light source.

A surface light source apparatus according to a first aspect of the present invention includes a point light source; a light guide plate which spreads light introduced from the point light source into a planar shape to output the light from a light outgoing plane; and a light blocking member which covers parts of the point light source and the light outgoing plane of the light guide plate, wherein a gap shielding member is projected toward the light outgoing plane from a surface on a side facing the light outgoing plane of the light blocking member, and at least a portion facing the light outgoing plane in the gap shielding member is made of a material having a light blocking property. As used herein, the point light source shall mean a light source in which a micro light emitting element such as a LED is used.

In the surface light source apparatus according to the first aspect of the present invention, the gap between the light blocking member and the light outgoing plane of the light guide plate is closed by the gap shielding member, and at least the portion on which the light having relatively large luminosity is incident in the gap, i.e., the portion facing at least the light outgoing plane in the gap shielding member is made of the material having a light blocking property. Therefore, the phenomenon in which the light of the point light source leaks from the gap and glitters like an eye can be prevented to improve the evenness of the light emission surface.

A surface light source apparatus according to a second aspect of the present invention includes a point light source; a light guide plate which spreads light introduced from the point light source into a planar shape to output the light from a light outgoing plane; and a point light source mounting wiring board which is disposed to cover parts of the point light source and the light outgoing plane of the light guide plate, wherein a gap shielding member is projected toward the light outgoing plane from a surface on a side facing the light outgoing plane of the wiring board, and at least a portion facing the light outgoing plane in the gap shielding member is made of a material having a light blocking property.

In the surface light source apparatus according to the second aspect of the present invention, the gap between the wiring board and the light outgoing plane of the light guide plate is closed by the gap shielding member, and at least the portion on which the light having relatively large luminosity is incident in the gap, i.e., the portion facing at least the light outgoing plane in the gap shielding member is made of the material having a light blocking property. Therefore, the phenomenon in which the light of the point light source leaks from the gap and glitters like an eye can be prevented to improve the evenness of the light emission surface.

In the surface light source apparatus according to the second aspect of the present invention, preferably the gap shielding member is not projected toward a side of the point light source from an end face facing the point light source of the light guide plate, and the gap shielding member is not projected from an end on a side of the light outgoing plane of the wiring board. Accordingly, the wiring board is exposed between the point light source and the end face (light incident plane) of the light guide plate while the wiring board is not covered with the gap shielding member. Therefore, at least part of the light outputted onto the wiring board side between the point light source and the end face of the light guide plate is reflected by the wiring board and is incident on the light guide plate, which enables enhancement of the light use efficiency. Because the gap shielding member is not projected from the end on the light outgoing plane side of the wiring board, it is not necessary that the gap shielding member projected from the wiring board be hidden by the rim sheet, and the opening of the rim sheet can be widened to increase the effective area of the surface light source apparatus.

In the surface light source apparatus according to the first or second aspect of the present invention, preferably the whole of the gap shielding member is made of the material having the light blocking property. Accordingly, the light does not pass through the gap, which further improves the effect of preventing the eye-shaped high-brightness region.

In the surface light source apparatus according to the first or second aspect of the present invention, preferably the material having the light blocking property is a black material or a light absorbing material. Accordingly, because the light is not reflected by the gap shielding member, the stray light is hardly generated.

In the surface light source apparatus according to the first or second aspect of the present invention, preferably the gap shielding member is located in front of the point light source in a light outgoing direction. Accordingly, the gap shielding member can be provided to the necessity minimum.

In the surface light source apparatus according to the first or second aspect of the present invention, preferably the gap shielding member is located at least in front of the point light source in a light outgoing direction or both sides of the point light source when viewed from a direction perpendicular to the light outgoing plane of the light guide plate. Accordingly, because the light source is surrounded by the gap shielding member, the light of the light source hardly leaks in any direction, and the light emission surface of the surface light source apparatus can further be uniformalized.

A surface light source apparatus according to a third aspect of the present invention includes a point light source; a light guide plate which spreads light introduced from the point light source into a planar shape to output the light from a light outgoing plane; a diffusing sheet which is disposed while facing the light outgoing plane of the light guide plate; and a light blocking member which covers parts of the point light source, the light outgoing plane of the light guide plate, and the diffusing sheet, wherein a light absorbing layer is formed in a surface on a side facing the light outgoing plane of the light blocking member, and the light absorbing layer is brought into contact with a surface of the diffusing sheet.

In the surface light source apparatus according to the third aspect of the present invention, the light absorbing layer provided in the light blocking member is brought into contact with the diffusing sheet, the light of the point light source which enters the gap between the light blocking member and the light guide plate is diffused by the diffusing sheet, and the light is incident on the light absorbing layer of the light blocking member and absorbed by the light absorbing layer. Therefore, the phenomenon in which the light of the point light source leaks from the gap and glitters like an eye can be prevented to improve the evenness of the light emission surface.

In the surface light source apparatus according to the third aspect of the present invention, preferably a gap shielding member is projected toward a surface facing the light outgoing plane of the light blocking member at a position withdrawn from a front end of the light blocking member. At this point, the gap shielding member may be in contact with the surface light source apparatus, or may have a micro gap. Accordingly, the gap between the light blocking member and the light guide plate is closed to hardly pass the light by the gap shielding member. Even when the gap exists between the gap shielding member and the light guide plate, the light of the point light source which enters the gap between the gap shielding member and the light guide plate is diffused by the diffusing sheet, and the light is incident on the light absorbing layer of the light blocking member and absorbed by the light absorbing layer. Therefore, the phenomenon in which the light of the point light source leaks from the gap and glitters like an eye can be prevented to improve the evenness of the light emission surface.

In the surface light source apparatus according to the third aspect of the present invention, preferably a prism pattern is formed in a surface facing the light outgoing plane of the diffusing sheet. Accordingly, because the course of the light can be bent by the prism pattern, the course of the light passing through the gap between the light blocking member and the light guide plate or the light passing between the gap shielding member and light guide plate can be bent and absorbed more surely by the light absorbing surface of the light blocking member.

The means for solving the problem in the present invention has the feature in which the above-described constituent components are appropriately combined, and various variations of the present invention can be made by the combination of the components.

DETAILED DESCRIPTION OF THE PREFERRED EMBODIMENTS

Preferred embodiments of the present invention will be described below with reference to the drawings.

First Embodiment

Figure 1:
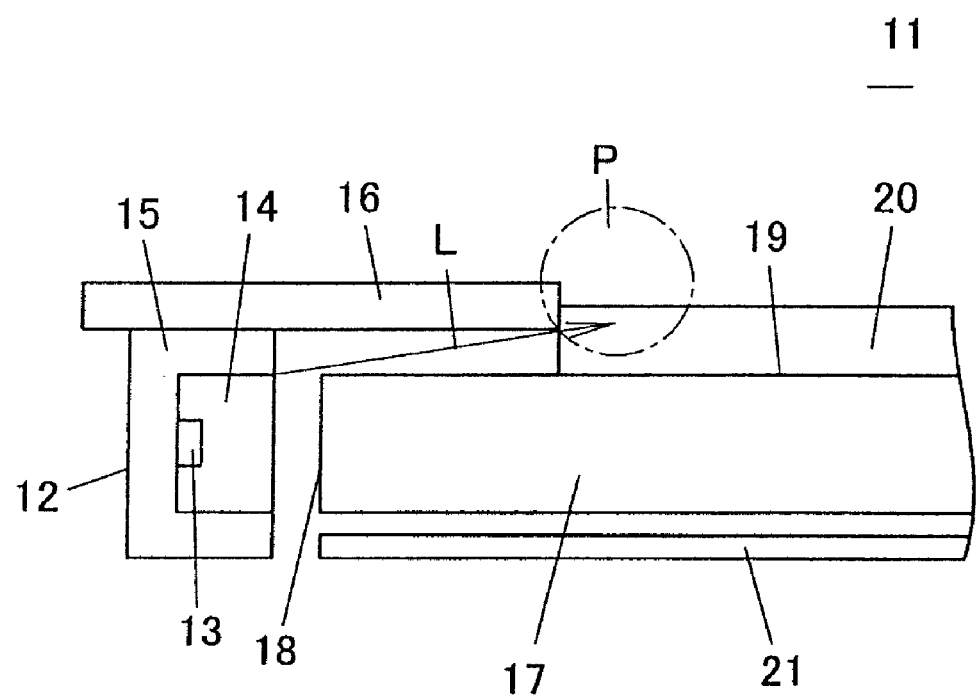
FIG. 1 shows a cross-sectional view, partially broken away, of a schematic structure of a conventional surface light source apparatus.
Figure 2:
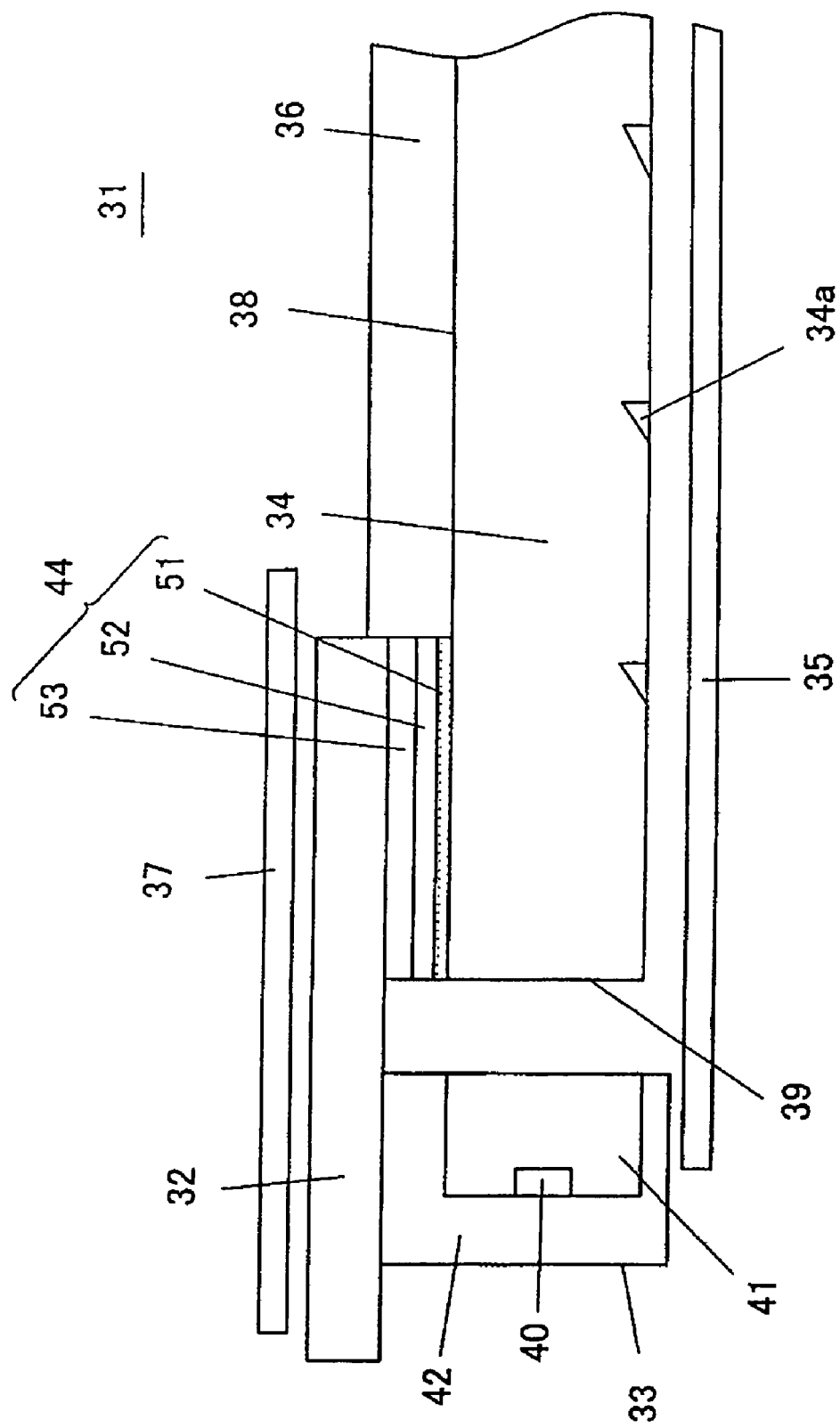
FIG. 2 shows a cross-sectional view, partially broken away, of a schematic structure of a surface light source apparatus according to a first embodiment of the present invention.

FIG. 2 shows a cross-sectional view, partially broken away, of schematic structure of a surface light source apparatus according to a first embodiment of the present invention. A surface light source apparatus 31 is used as a backlight for a liquid crystal display device. The surface light source apparatus 31 mainly includes a light source 33, a light guide plate 34, a reflector plate 35, a diffusing sheet 36, and a rim sheet 37 which are mounted on a flexible printed board 32.

The light guide plate 34 is molded in a thin plate made of a transparent resin material having a high refractive index such as polycarbonate resin and polymethyl methacrylate (PMMA). Although a light outgoing plane 38 of the light guide plate 34 is formed in a substantially smooth surface, the light outgoing plane 38 is formed in a finely coarse surface when viewed closely. A number of fine deflection patterns 34a are formed in a surface (hereinafter referred to as back side) opposite the light outgoing plane 38 of the light guide plate 34. The fine deflection pattern 34a totally reflects the light guided through the light guide plate 34 to output the light to the outside from the light outgoing plane 38. There is no particularly limitation on the shape and the arrangement of the deflection patterns 34a. For example, a number of deflection patterns 34a which are recessed in the form of triangular grooves in the back side of the light guide plate 34 are coaxially arranged while substantially centered on the light source 33.

The light emitted from the light source 33 is incident on the light guide plate 34 from a light incident plane 39 of the light guide plate 34, and the light is totally reflected repeatedly between the back side and the light outgoing plane 38 of the light guide plate 34. The light incident on the deflection pattern 34a during the total reflection between the back side and the light outgoing plane 38 is total-reflected from the deflection pattern 34a and outputted to the outside from the light outgoing plane 38.

Because the reflector plate 35 faces the back side of the light guide plate 34, the reflector plate 35 reflects the light leaking from the back side of the light guide plate 34 and returns the light into the light guide plate 34, thereby improving the light use efficiency.

The diffusing sheet 36 is disposed on the light outgoing plane 38, and a periphery on an upper surface side of the diffusing sheet 36 is covered with the frame-shape rim sheet 37. Therefore, the light outgoing from the light outgoing plane 38 is diffused by the diffusing sheet 36 and outputted toward a front face.

The light source 33 is a light source (point light source) in which a LED 40 (chip) is used. The one light source 33 may be used in the surface light source apparatus 31 or a plurality of the light sources 33 may be used in the surface light source apparatus 31. The LED 40 is sealed in a transparent resin 41. An upper surface, a lower surface, right and left side faces, and a rear surface of the transparent resin 41 are covered with a case 42 made of a white resin. Therefore, the front face of the transparent resin 41 is exposed from a front opening of the case 42.

When the LED 40 emits the light, the light from the LED 40 travels through the transparent resin 41 and outputted to the outside from the front face of the light source 33, or the light is reflected one or a plurality of times at a boundary between the transparent resin 41 and case 42 and outputted to the outside from the front face of the light source 33.

Figure 3A:
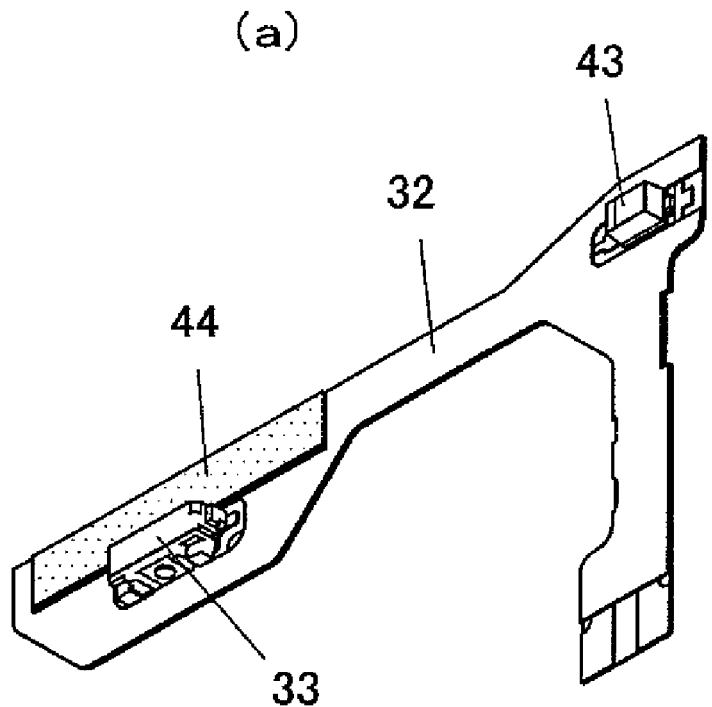
FIG. 3A shows a perspective view of a flexible printed board on which a light source is mounted.
Figure 3B:
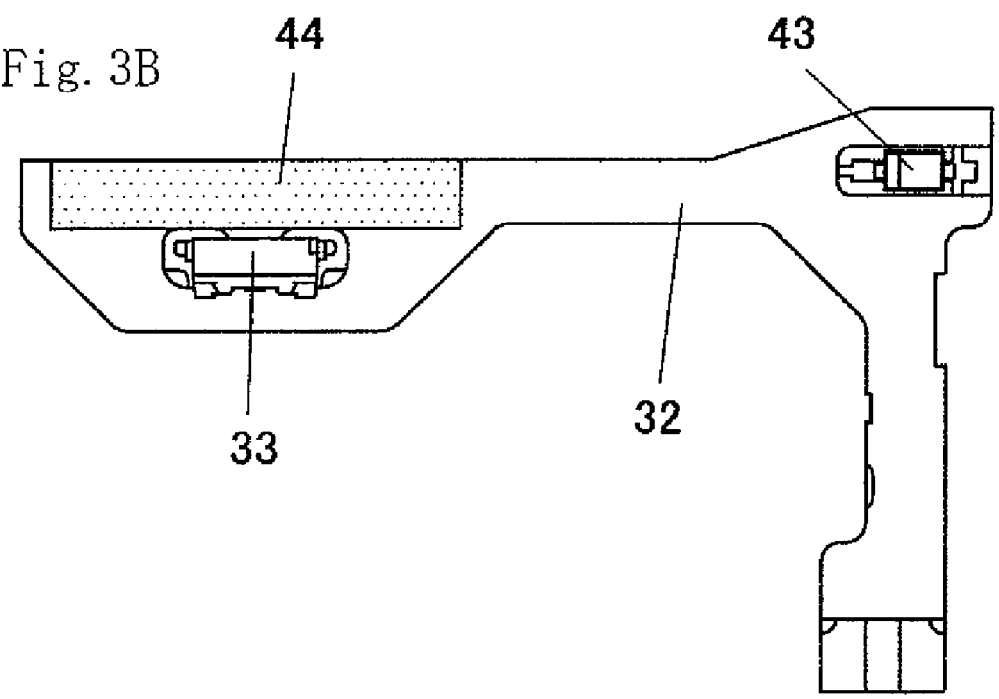
FIG. 3B shows a plan view of the flexible printed board.

As shown in FIGS. 3A and 3B, the light source 33 is mounted on the flexible printed board 32 along with an electronic component 43 such as a Zener diode. A gap shielding member 44 is formed in front of the light source 33 in the surface of the flexible printed board 32.

Figure 4:
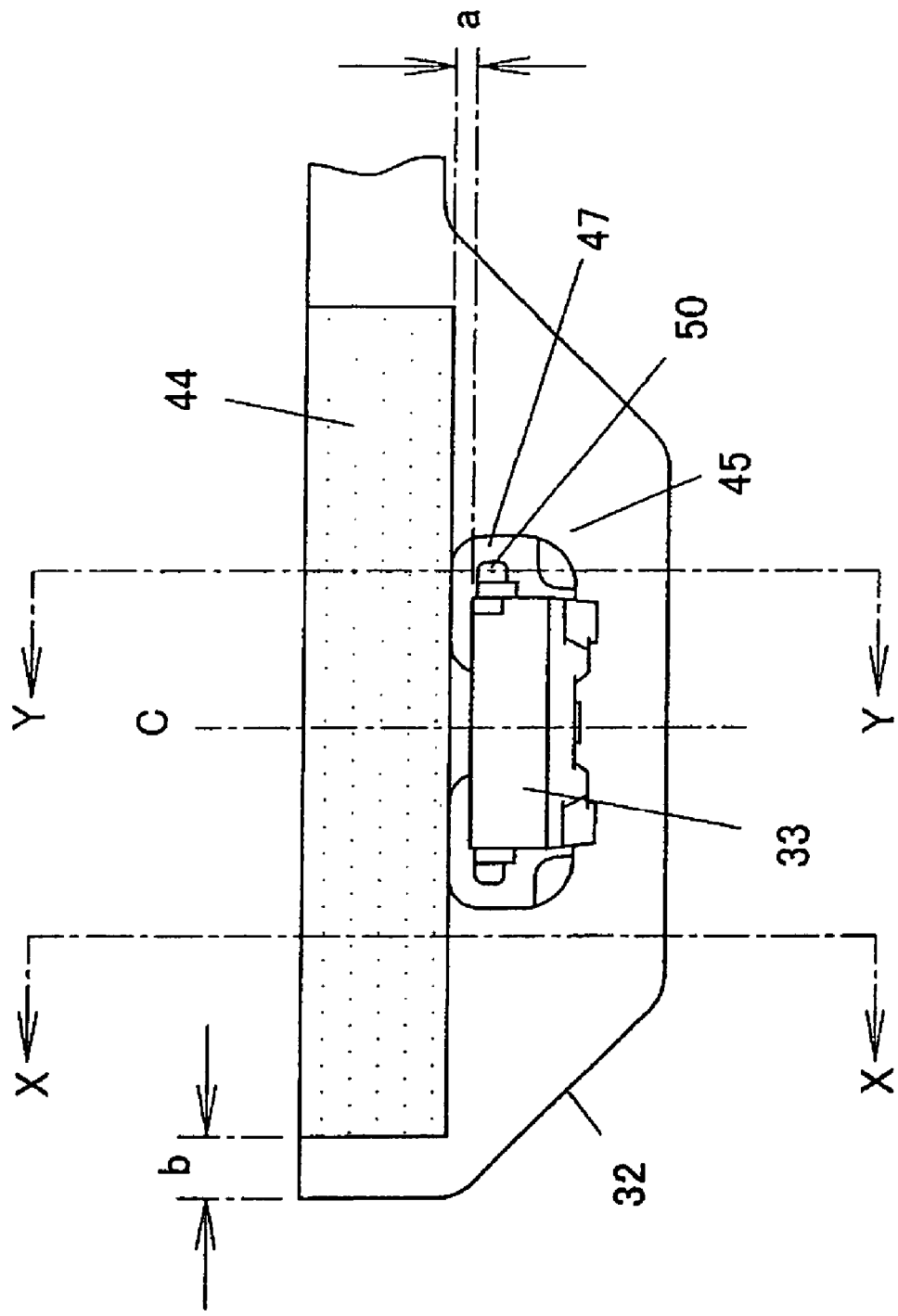
FIG. 4 shows a plan view of an enlarged light source portion of FIG. 3B.
Figure 5A:
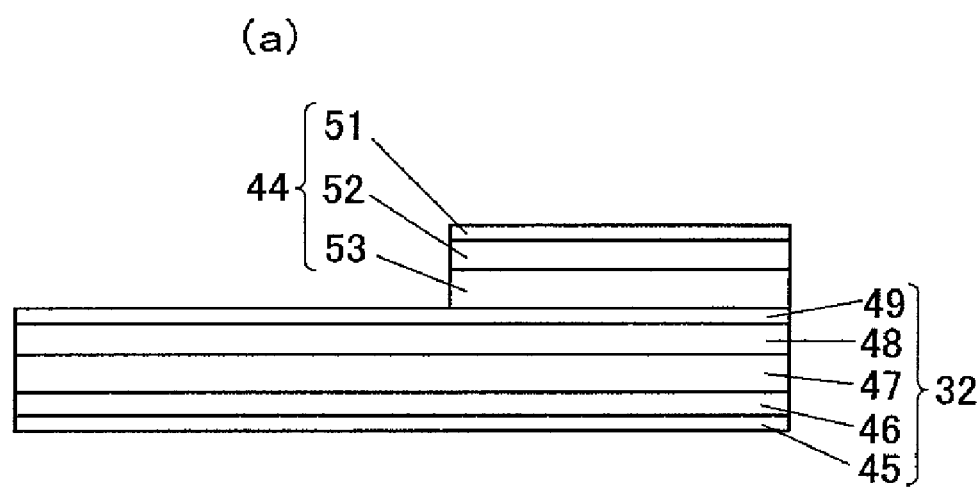
FIG. 5A shows a cross-sectional view taken along a line X-X of FIG. 4.
Figure 5B:
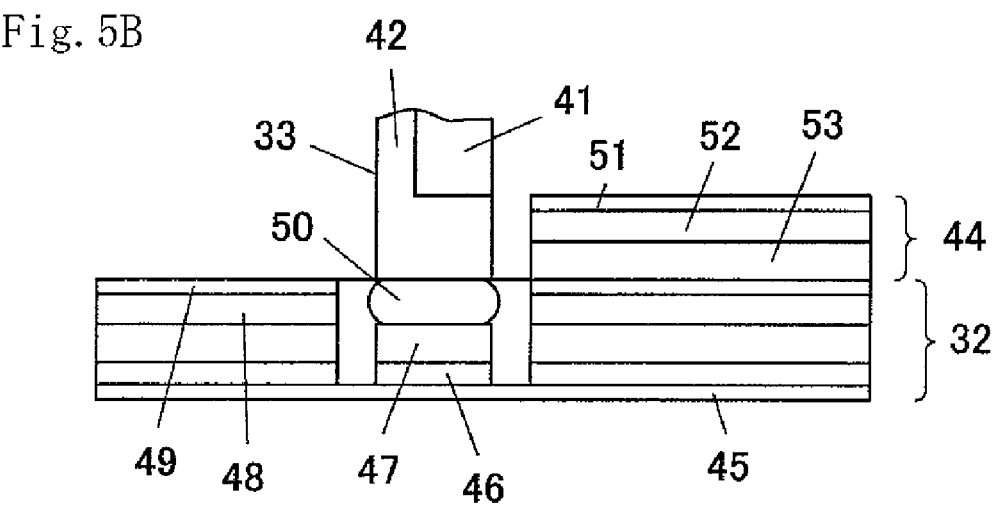
FIG. 5B shows a cross-sectional view taken along a line Y-Y of FIG. 4.

FIG. 4 shows a plan view of the enlarged light source of FIG. 3B, FIG. 5A shows a cross-sectional view taken along a line X-X of FIG. 4, and FIG. 5B shows a cross-sectional view taken along a line Y-Y of FIG. 4. As shown in FIG. 5A, in the flexible printed board 32, a conductor layer 47 (pattern wiring) formed by a rolled copper foil having a thickness of 35 μm is laminated on a base film 45 made of polyimide having a thickness of 12.5 μm by an adhesive agent layer 46 having a thickness of 20 μm, and a cover film 49 made of polyimide having a thickness of 12.5 μm is further laminated on the conductor layer 47 by an adhesive agent layer 48 having a thickness of 25 μm. As shown in FIG. 5B, in a portion where the light source 33 is mounted, the cover film 49 and the adhesive agent layer 48 are partially removed to expose the conductor layer 47, the light source 33 is placed on the flexible printed board 32, and an electrode provided on the lower surface of the light source 33 is soldered to the respective conductor layer 47 of the flexible printed board 32 with a solder 50. Therefore, the lower surface of the case 42 of the light source 33 is aligned with the same height as the upper surface of the flexible printed board 32.

As shown in FIG. 4, the gap shielding member 44 adheres to a front region of the light source 33 while being separated by a distance of a=0.25 mm from the front face of the light source 33. In a longitudinal direction, the gap shielding member 44 is formed in symmetric in relation to a center line C passing through the center of the light source 33, and an end of the gap shielding member 44 is withdrawn by b=0.6 mm from an end of the flexible printed board 32.

As shown in FIGS. 5A and 5B, the gap shielding member 44 is bonded onto a cover film 49 of the flexible printed board 32. The gap shielding member 44 is formed by a light blocking layer 51, a reinforcing plate 52, and an adhesive agent layer 53 in order from the upper layer. The reinforcing plate 52 is formed by a thin plate made of polyimide. In the light blocking layer 51, a surface treatment layer is formed on the surface of the reinforcing plate 52, and silk-screen printing of a black coating material (for example, CR-18C-KT1 produced by Asahi Chemical Research Laboratory Co., Ltd.) is performed onto the surface treatment layer. The surface treatment layer includes an underlying layer made of Ni and an upper layer made of Au, and the surface treatment layer is formed by NiAu electrolytic plating. The surface of the black coating material is roughened and delustered. The adhesive agent layer 53 is a transparent thermosetting epoxy adhesive agent, and the gap shielding member 44 is adhesively bonded onto the flexible printed board 32 by the adhesive agent layer 53.

Figure 6:
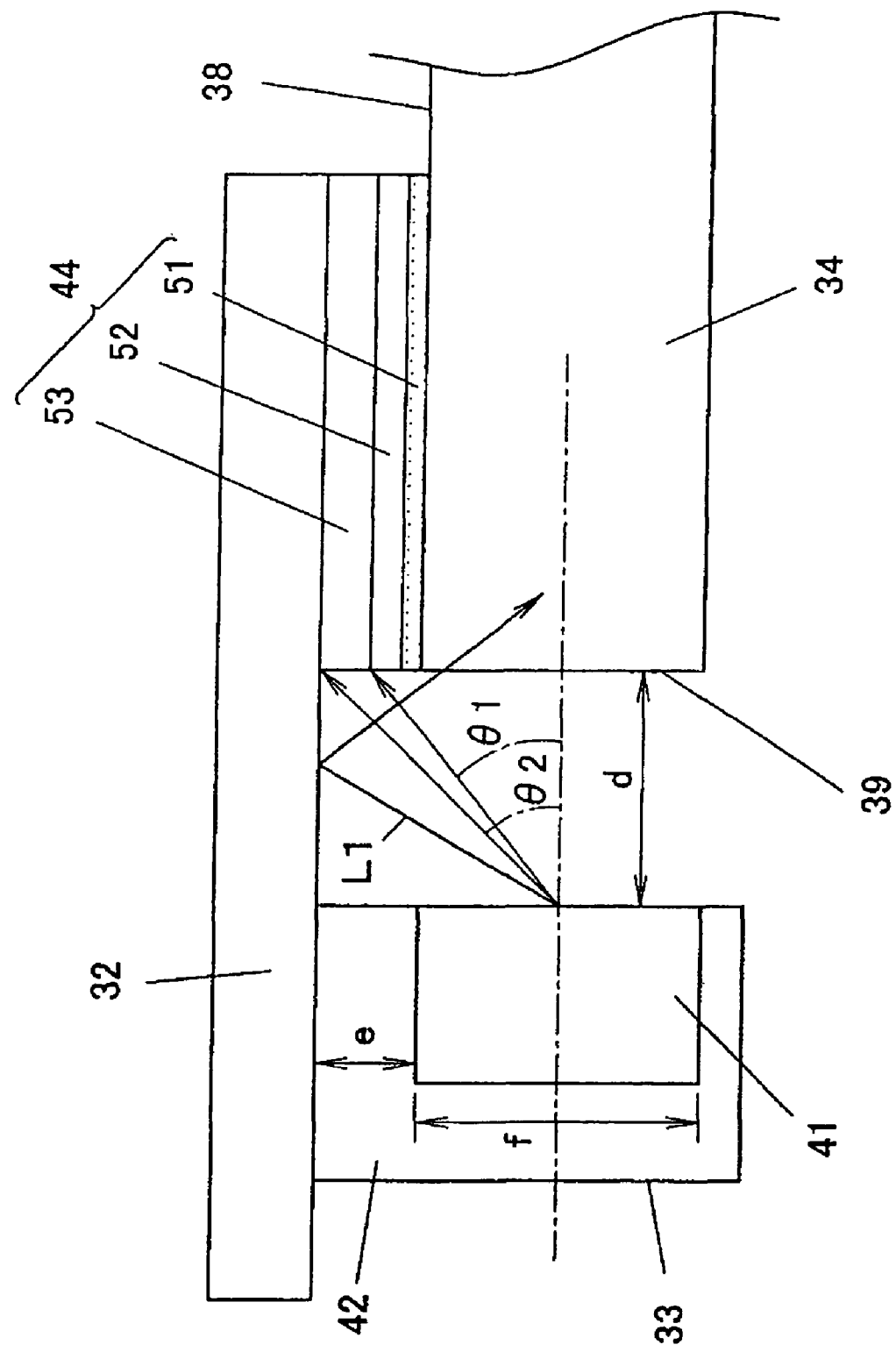
FIG. 6 shows a schematic cross-sectional view for explaining action of the surface light source apparatus according to the first embodiment.

As shown in FIG. 6, the thickness of the gap shielding member 44 is equal to a thickness e of the face on the mounting side of the case 42. For example, in the present embodiment, the face on the mounting side of the case 42 has the thickness of 72.5 μm. Therefore, the gap shielding member 44 has the total thickness of 72.5 μm in which the light blocking layer 51 has the thickness of 12.5 μm, the reinforcing plate 52 has the thickness of 25 μm, and the adhesive agent layer 53 has the thickness of 35 μm.

The light source 33 thus mounted on the flexible printed board 32 is vertically inverted while the flexible printed board 32 is faced up, and the light source 33 is arranged to face the light incident plane 39 of the light guide plate 34. The gap shielding member 44 provided in the flexible printed board 32 is brought into surface contact with an end portion in the light outgoing plane 38 of the light guide plate 34. A height f of the transparent resin 41 of the light source 33 is equal to the thickness of the light guide plate 34, and the light source 33 is disposed such that the center in the height direction of the transparent resin 41 coincides with the center in the thickness direction of the light guide plate 34. Furthermore, because the thickness of the gap shielding member 44 is equal to the thickness e of the face on the mounting side of the case 42, a gap is not generated between the surface of the light blocking layer 51 of the gap shielding member 44 and the light outgoing plane 38 of the light guide plate 34.

Therefore, in front of the light source 33, the gap between the flexible printed board 32 and the light outgoing plane 38 is closed by the gap shielding member 44. Particularly, in the gap, the region adjacent to the light outgoing plane 38 is closed by the light blocking layer 51 and the reinforcing plate 52 which are of a light blocking material. As a result, the light emitted from the light source 33 hardly passes between the flexible printed board 32 and light outgoing plane 38, and the eye-shaped high-brightness region is hardly generated at an edge of the flexible printed board 32 or rim sheet 37 to uniformize the light emission surface.

Because the gap shielding member 44 has the transparent adhesive agent layer 53, the light incident on the gap shielding member 44 from the light source 33 is transmitted through the adhesive agent layer 53. However, the light transmitted through the adhesive agent layer 53 has little influence due to a directivity characteristic as described below. As shown in FIG. 6, it is assumed that the height f of the transparent resin 41 is set to 650 μm, the distance d between the front face of the light source 33 and the light incident plane 39 is set to 250 μm, the thickness e on the mounting side of the case 42 is set to 72.5 μm, the thickness of the light blocking layer 51 is set to 12.5 μm, the thickness of the reinforcing plate 52 is set to 25 μm, and the thickness of the adhesive agent layer 53 is set to 35 μm. The light emitted to the direction ranging from 55° (θ1) to 58° (θ2) relative to an optical axis direction (perpendicular to the front face of the light source 33 and the light incident plane 39) is incident from the center of the front face of the light source 33 on an end face of the transparent resin 41.

Figure 7:
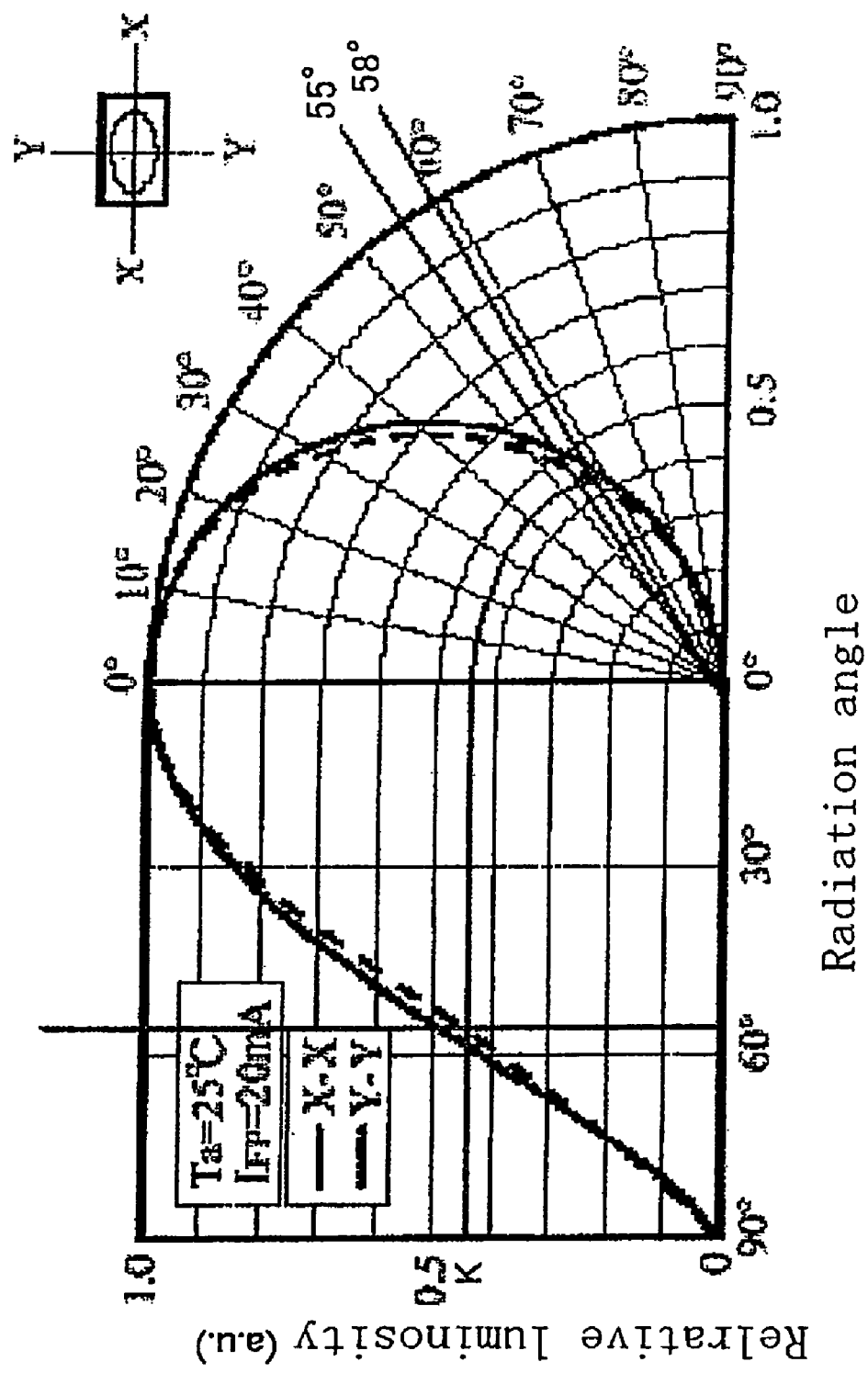
FIG. 7 shows a relationship between a radiation angle and a relative luminosity of a LED.

On the other hand, referring to a LED directivity characteristic curve of FIG. 7, in the case of the radiation angle θ1=58°, the relative luminosity becomes K of about 42% in FIG. 7. When the radiation angle ranges from 55° to 58°, the luminosity becomes only about 42 to 47% relative to a front-face luminosity (luminosity in the 0° direction), so that it does not matter because of the small luminosity. The fact can also be confirmed through experiments. FIG. 7 shows a directivity characteristic of a LED (model name: NESW008C) presented by Nichia Corporation (http://www.nichia.co.jp/specification/jp/led_smd/NESW008CT.pdf).

Obviously, because the adhesive agent layer 53 desirably does not transmit the light, the (e.g. black) adhesive agent or tackiness agent having the light blocking property may be used as the adhesive agent layer 53.

The end of the gap shielding member 44 on the side of the light source 33 is configured so as not to be projected toward the side of the light source 33 from the light incident plane 39. When the gap shielding member 44 is projected from the light incident plane 39, the light traveling upward in the gap between the light source 33 and the light incident plane 39 is absorbed by the gap shielding member 44. On the contrary, when the gap shielding member 44 is not projected from the light incident plane 39, the flexible printed board 32 is exposed in the upper portion of the gap between the light source 33 and the light incident plane 39. Therefore, like a light beam L1 shown in FIG. 6, the light traveling upward in the gap between the light source 33 and the light incident plane 39 is reflected by the flexible printed board 32 is incident on the light guide plate 34, so that the light use efficiency can be enhanced.

The end of the gap shielding member 44 on the side opposite the light source 33 is configured so as not to be projected from the end of the flexible printed board 32. When the gap shielding member 44 is projected from the end of the flexible printed board 32, in order to hide the gap shielding member 44 projected from the flexible printed board 32, it is necessary to further reduce the opening of the rim sheet 37. Therefore, the effective region of the surface light source apparatus 31 is reduced by the reduced opening of the rim sheet 37.

In the case where the light blocking layer 51 of the gap shielding member 44 has a light absorbing property, when the light blocking layer 51 comes into optically close contact with the light outgoing plane 38 of the light guide plate 34, the light guided through the light guide plate 34 is absorbed by the light blocking layer 51 when entering the region where the light blocking layer 51 comes into close contact with the light outgoing plane 38, which possibly causes loss. Therefore, in the surface light source apparatus 31, the light outgoing plane 38 of the light guide plate 34 and/or the surface of the light blocking layer 51 are roughened such that the optically close contact is hardly established between the light outgoing plane 38 and the surface of the light blocking layer 51.

Figure 8:
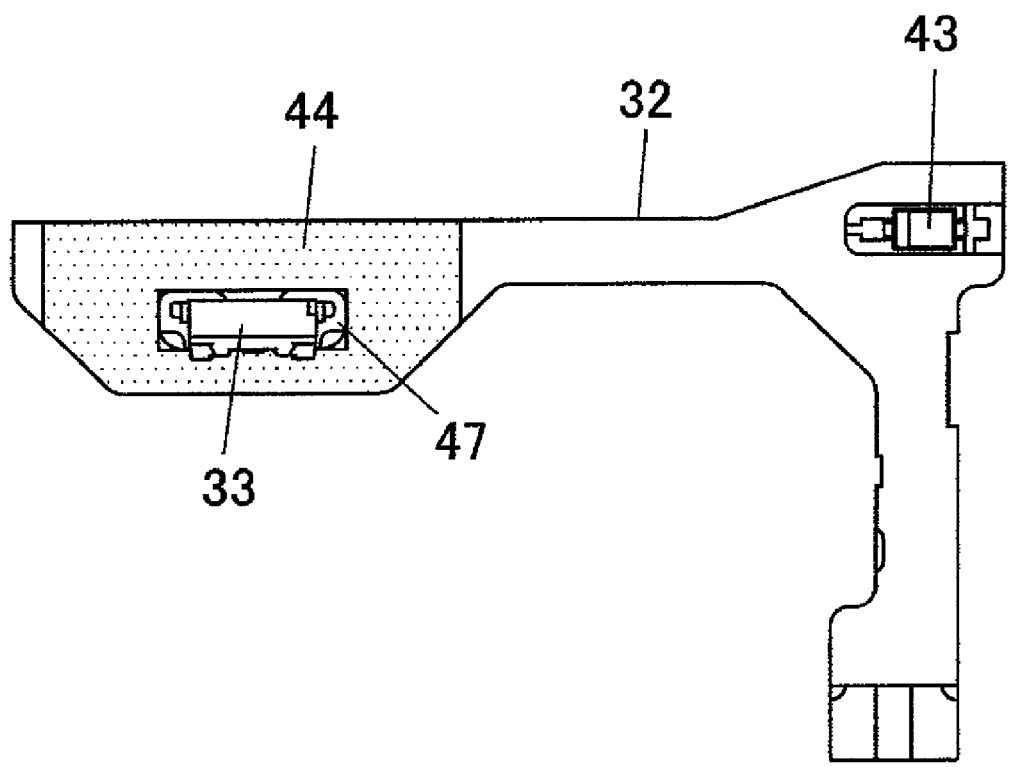
FIG. 8 shows a plan view of a flexible printed board in which a gap shielding member is provided in a different region.

As shown in FIG. 8, the gap shielding member 44 may be provided in the region surrounding the light source 33 in the surface of the flexible printed board 32. Alternatively, the gap shielding member 44 may be provided in the form of a U-shape so as to surround the front face and side faces of the light source 33.

Desirably the gap shielding member 44 is brought into contact with the light outgoing plane 38 of the light guide plate 34 to the extent where the gap shielding member 44 is not brought into close contact with the light outgoing plane 38. However, a micro gap may be generated between the gap shielding member 44 and the light outgoing plane 38.

Second Embodiment

Figure 9:
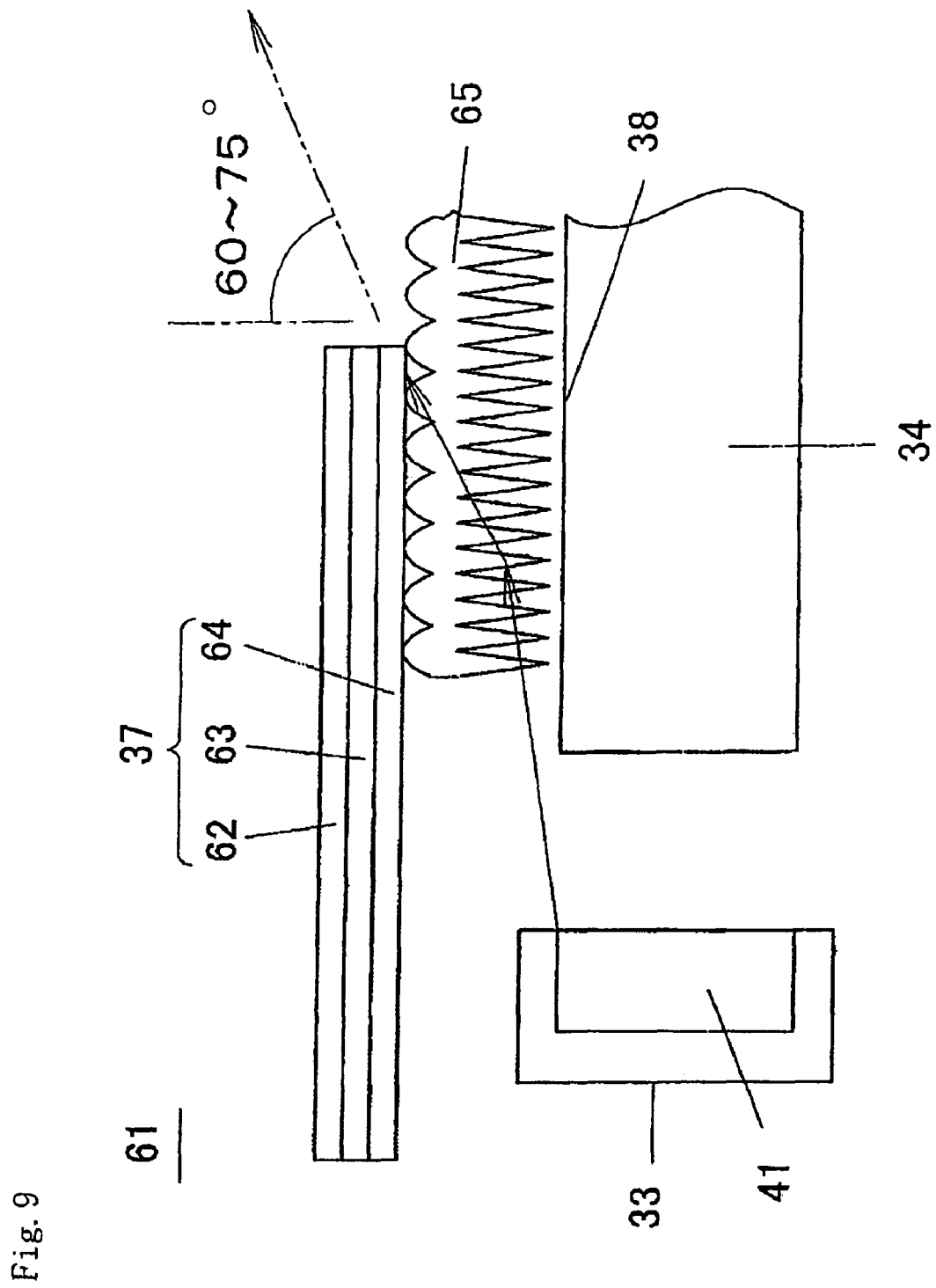
FIG. 9 shows a cross-sectional view, partially broken away, of a schematic structure of a surface light source apparatus according to a second embodiment of the present invention.

FIG. 9 shows a cross-sectional view, partially broken away, of a schematic structure of a surface light source apparatus according to a second embodiment of the present invention. The rim sheet 37 whose surface constitutes a light absorbing tackiness agent layer is used in a surface light source apparatus 61. That is, the rim sheet 37 is formed by a double-sided adhesive tape (for example, NITTO DENKO No. 532 black produced by NITTO DENKO CORPORATION), and the rim sheet 37 has the total thickness of 125 μm. In the double-sided adhesive tape, black tackiness agents 62 and 64 are applied onto both surfaces of a core material 63 made of transparent polyethylene terephthalate (PET). An end portion of a diffusing sheet 65 disposed above the light outgoing plane 38 of the light guide plate 34 is extended to a position below the rim sheet 37, and the tackiness agent 64 in the lower surface of the rim sheet 37 is bonded to the upper surface of the diffusing sheet 65. A fine diffusing pattern is formed in the upper surface of the diffusing sheet 65 to diffuse the light, and a prism pattern is formed in the lower surface of the diffusing sheet 65 to refract the light outputted from the light outgoing plane 38 in the direction perpendicular to the diffusing sheet 65.

According to the surface light source apparatus 61 having the above structure, the light emitted from the light source 33 enters the gap between the rim sheet 37 and the light outgoing plane 38 of the light guide plate 34, the light is incident on the lower surface (prism pattern) of the diffusing sheet 65, a course of the light is bent upward, and the light is diffused by the upper surface of the diffusing sheet 65. Therefore, the light incident on the diffusing sheet 65 passes through the diffusing sheet 65, is incident on the lower surface of the rim sheet 37, and is absorbed by the tackiness agent 64. As a result, the generation of the eye-shaped high-brightness region can be prevented in front of the light source 33. Particularly, the eye-shaped light spot viewable when observed from the direction ranging from 60° to 75° relative to the direction perpendicular to the light outgoing plane 38 can be eliminated in the present embodiment.

On the other hand, because the transparent tackiness agent is used in the conventional rim sheet, even if the rim sheet 37 is bonded to the diffusing sheet 65, the light transmitted through the diffusing sheet 65 is guided through the transparent tackiness agent layer, and the light is outputted from the end of the rim sheet 37. Therefore, there is no effect of eliminating the eye-shaped high-brightness region.

Although the flexible printed board 32 is not shown in the present embodiment, the flexible printed board 32 may be provided either on the upper side of the light source 33 or the lower side of the light source 33. However, in the case where the flexible printed board 32 is disposed on the upper side of the light source 33, it is necessary that the lower surface of the diffusing sheet 65 shall not be covered with the flexible printed board 32. The tackiness agent 62 may be omitted.

Third Embodiment

Figure 10:
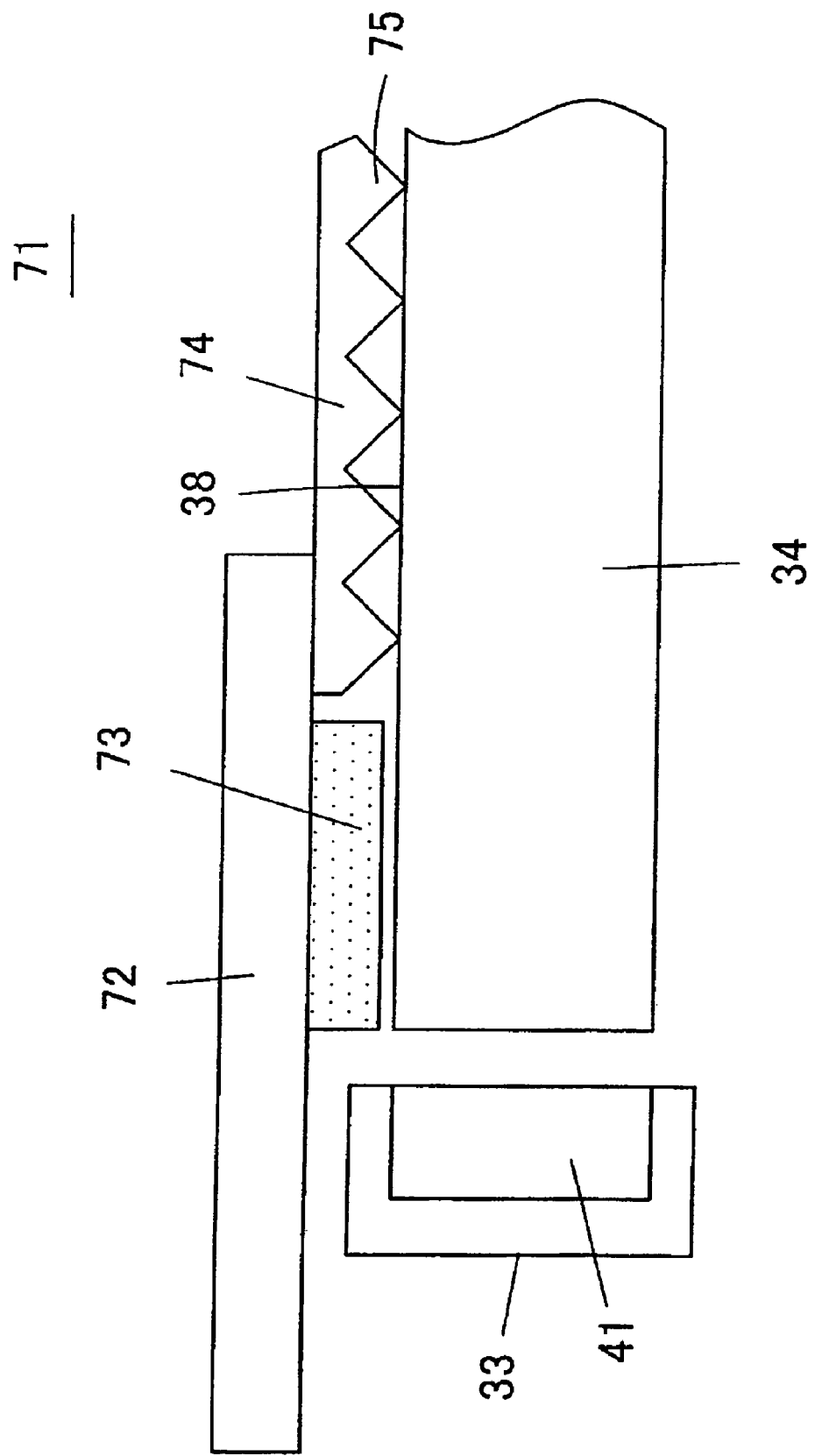
FIG. 10 shows a cross-sectional view, partially broken away, of a schematic structure of a surface light source apparatus according to a third embodiment of the present invention.

FIG. 10 shows a cross-sectional view, partially broken away, of a schematic structure of a surface light source apparatus according to a third embodiment of the present invention. In a surface light source apparatus 71, a light blocking tape is bonded to the lower surface of a light blocking member 72 to project a gap shielding member 73. The light blocking member 72 is formed by a rim sheet or a light blocking tape. In the case where the light blocking member 72 is formed by a rim sheet, the light blocking tape which is of the gap shielding member 73 is bonded to the lower surface. In the case where the light blocking member 72 is formed by a light blocking tape, after the two layers of the light blocking tape are formed, an unnecessary portion of the lower-layer light blocking tape is removed to form the gap shielding member 73.

A diffusing sheet 74 is disposed on the light outgoing plane 38 of the light guide plate 34, and a prism pattern 75 is formed in the lower surface of the diffusing sheet 74. The gap shielding member 73 projected toward the lower surface of the light blocking member 72 such as the rim sheet and the light blocking tape is made to face the light outgoing plane 38 of the light guide plate 34, and the lower surface of the light blocking member 72 is brought into contact with the upper surface of the diffusing sheet 74.

In the present embodiment, the gap shielding member 73 may be in contact with the light outgoing plane 38 of the light guide plate 34, and the gap between the fight blocking member 72 and the light outgoing plane 38 may be closed by the gap shielding member 73. In this case, because the gap between the light blocking member 72 and the light outgoing plane 38 is closed by the gap shielding member 73, the light never leaks from the gap between the light blocking member 72 and the light outgoing plane 38, which makes it possible to prevent the generation of the eye-shaped high-brightness region near the end portion of the light blocking member 72.

In the present embodiment, in the case where the light blocking member 72 is formed by a light absorbing material, a micro gap may be formed between the gap shielding member 73 and the light outgoing plane 38 as shown in FIG. 10. In this case, after the gap between the light blocking member 72 and the light guide plate 34 is shielded by the gap shielding member 73 to make the light hardly pass therethrough, the course of the light passing between the gap shielding member 73 and the light outgoing plane 38 is bent upward by the prism pattern 75. Then, the light is diffused by the diffusing sheet 74, is incident on the light blocking member 72, and is absorbed by the light blocking member 72. Therefore, the light never leaks from the gap between the light blocking member 72 and the light outgoing plane 38, and the generation of the eye-shaped high-brightness region can be prevented near the end portion of the light blocking member 72.

Although the flexible printed board 32 is not shown in the present embodiment, the flexible printed board 32 may be provided either on the upper side of the light source 33 or the lower side of the light source 33.

What is claimed is:

1. A surface light source apparatus comprising:
   a point light source comprising an LED disposed in a non-transparent case;
   a light guide plate which spreads light introduced from the point light source into a planar shape to output the light from a light outgoing plane; and
   a light blocking member which covers parts of the point light source and the light outgoing plane of the light guide plate,
   wherein a gap shielding member is projected toward the light outgoing plane from a surface on a side facing the light outgoing plane of the light blocking member, and at least a portion facing the light outgoing plane in the gap shielding member is made of a material having a light blocking and roughened surface property,
   wherein the gap shielding member has a first surface facing the light blocking member and a second surface facing the light guide plate, and the gap shielding member comprises an adhesive agent layer disposed only on the first surface,
   wherein a thickness of the gap shielding member is equal to a thickness of a face of the case facing the light guide plate on the mounting side, and
   the thickness of the face of the case facing the light guide plate on the mounting side is equal to a thickness of a gap between the light blocking member and the light outgoing plane.

2. The surface light source apparatus according to claim 1, wherein the whole of the gap shielding member is made of the material having the light blocking property.

3. The surface light source apparatus according to claim 1, wherein the material having the light blocking property is a black material or a light absorbing material.

4. The surface light source apparatus according to claim 1, wherein the gap shielding member is located in front of the point light source in a light outgoing direction.

5. The surface light source apparatus according to claim 1, wherein the gap shielding member is located at least in front of the point light source in the light outgoing direction or both sides of the point light source when viewed from a direction perpendicular to the light outgoing plane of the light guide plate.

6. The surface light source apparatus according to claim 1, wherein a distance between the point light source and the light guide plate is greater than the thickness of the gap shielding member.

7. A surface light source apparatus comprising:
   a point light source comprising an LED disposed in a non-transparent case;
   a light guide plate which spreads light introduced from the point light source into a planar shape to output the light from a light outgoing plane; and
   a point light source mounting wiring board which is disposed to cover parts of the point light source and the light outgoing plane of the light guide plate,
   wherein a gap shielding member is projected toward the light outgoing plane from a surface on a side facing the light outgoing plane of the wiring board, and at least a portion facing the light outgoing plane in the gap shielding member is made of a material having a light blocking and roughened surface property,
   wherein the gap shielding member has a first surface facing the wiring board and a second surface facing the light guide plate, and the gap shielding member comprises an adhesive agent layer disposed only on the first surface,
   wherein a thickness of the gap shielding member is equal to a thickness of a face of the case facing the light guide plate on the mounting side, and
   wherein the thickness of the face of the case facing the light guide plate on the mounting side is equal to a thickness of a gap between the wiring board and the light outgoing plane.

8. The surface light source apparatus according to claim 7, wherein the gap shielding member is not projected toward a side of the point light source from an end face facing the point light source of the light guide plate, and the gap shielding member is not projected from an end on a side of the light outgoing plane of the wiring board.

9. The surface light source apparatus according to claim 7, wherein the whole of the gap shielding member is made of the material having the light blocking property.

10. The surface light source apparatus according to claim 7, wherein the material having the light blocking property is a black material or a light absorbing material.

11. The surface light source apparatus according to claim 7, wherein the gap shielding member is located in front of the point light source in a light outgoing direction.

12. The surface light source apparatus according to claim 7, wherein the gap shielding member is located at least in front of the point light source in the light outgoing direction or both sides of the point light source when viewed from a direction perpendicular to the light outgoing plane of the light guide plate.

13. The surface light source apparatus according to claim 7, wherein a distance between the point light source and the light guide plate is greater than the thickness of the gap shielding member.

* * * * *